United States Patent
Pokorny

(10) Patent No.: US 9,022,619 B2
(45) Date of Patent: May 5, 2015

(54) OPTICAL CONSTRUCTIONS AND METHOD OF MAKING THE SAME

(75) Inventor: Richard J. Pokorny, Maplewood, MN (US)

(73) Assignee: 3M Innovative Properties Company, St. Paul, MN (US)

(*) Notice: Subject to any disclaimer, the term of this patent is extended or adjusted under 35 U.S.C. 154(b) by 454 days.

(21) Appl. No.: 13/496,330

(22) PCT Filed: Oct. 7, 2010

(86) PCT No.: PCT/US2010/051760
§ 371 (c)(1),
(2), (4) Date: Mar. 15, 2012

(87) PCT Pub. No.: WO2011/049751
PCT Pub. Date: Apr. 28, 2011

(65) Prior Publication Data
US 2012/0195050 A1    Aug. 2, 2012

Related U.S. Application Data

(60) Provisional application No. 61/254,243, filed on Oct. 23, 2009.

(51) Int. Cl.
*F21V 9/10* (2006.01)
*G02B 5/02* (2006.01)

(52) U.S. Cl.
CPC .......................................... *G02B 5/02* (2013.01)

(58) Field of Classification Search
USPC ............. 362/311.03, 510, 84, 230, 231, 260, 362/293, 311.02, 351; 313/598–506, 313/498–506
See application file for complete search history.

(56) References Cited

U.S. PATENT DOCUMENTS

| | | | |
|---|---|---|---|
| 5,607,764 | A | 3/1997 | Konno |
| 6,268,961 | B1 | 7/2001 | Nevitt |
| 6,280,063 | B1 | 8/2001 | Fong |
| 6,602,596 | B2 | 8/2003 | Kimura |
| 6,771,335 | B2 | 8/2004 | Kimura |
| 6,809,782 | B1 | 10/2004 | Kawamoto |

(Continued)

FOREIGN PATENT DOCUMENTS

| | | |
|---|---|---|
| JP | 2007272208 | 10/2007 |
| WO | WO 03/032074 | 4/2003 |

(Continued)

OTHER PUBLICATIONS

International Search Report, PCT/US2010/051760, mailed Jan. 19, 2011, 4 pages.

*Primary Examiner* — Joseph L Williams
(74) *Attorney, Agent, or Firm* — Bradford B. Wright

(57) ABSTRACT

An optical construction comprises an optically transmissive first layer having a first and second major surfaces, and an optically transmissive second layer adjacent the first major surface and defining an interface. The optically transmissive second layer comprises a binder and optical beads. The binder comprises from 55 to 99.9 percent by weight of polyethylene oxide segments. A weight ratio of the binder to the optical beads is in a range of from 44:56 to 50:50. A light source is disposed in a fixed orientation relative to the optically transmissive second layer. Methods of making optical constructions, and electronic devices containing them, are also disclosed.

14 Claims, 1 Drawing Sheet

(56) References Cited

U.S. PATENT DOCUMENTS

| | | |
|---|---|---|
| 6,985,295 B2 | 1/2006 | Ahn |
| 2004/0246584 A1 | 12/2004 | Ahn |
| 2005/0024558 A1 | 2/2005 | Toyooka |
| 2005/0053729 A1 | 3/2005 | Bourdelais |
| 2005/0068628 A1 | 3/2005 | Masaki |
| 2005/0123742 A1 | 6/2005 | Flosenzier |
| 2005/0195588 A1 | 9/2005 | Kang |
| 2005/0265046 A1 | 12/2005 | Liu |
| 2006/0087865 A1 | 4/2006 | Ha |
| 2006/0133109 A1 | 6/2006 | Kim |
| 2006/0209404 A1 | 9/2006 | Kim |
| 2007/0134438 A1 | 6/2007 | Fabick |
| 2008/0002256 A1 | 1/2008 | Sasagawa |
| 2009/0268299 A1 | 10/2009 | Furui |
| 2012/0200919 A1 | 8/2012 | Petaja |

FOREIGN PATENT DOCUMENTS

| | | |
|---|---|---|
| WO | WO 2005/109085 | 11/2005 |
| WO | WO 2008/020587 | 2/2008 |
| WO | WO 2008/100057 | 8/2008 |
| WO | WO 2009/029438 | 3/2009 |

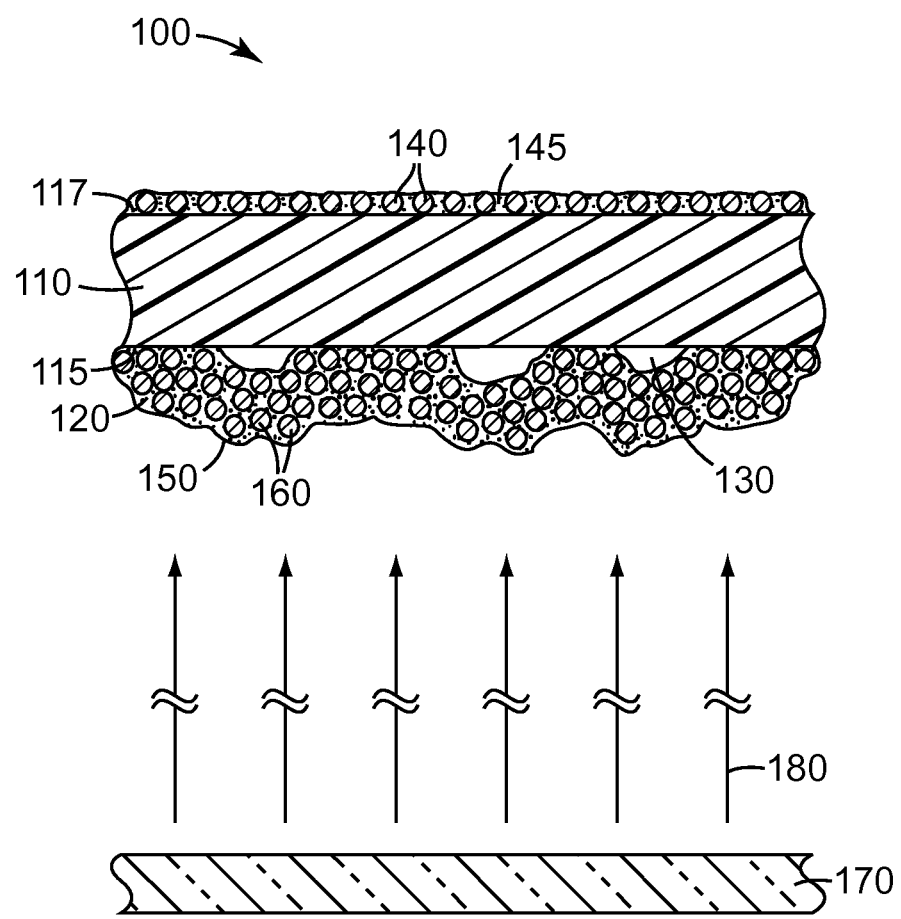

OPTICAL CONSTRUCTIONS AND METHOD OF MAKING THE SAME

CROSS-REFERENCE TO RELATED APPLICATIONS

This application is a national stage filing under 35 U.S.C. 371 of PCT/US2010/051760, filed Oct. 7, 2010, which claims priority to U.S. Provisional Application No. 61/254,243, filed Oct. 23, 2009, the disclosures of which are incorporated by reference in their entirety herein.

TECHNICAL FIELD

The present disclosure broadly relates to optical constructions.

BACKGROUND

Optical films are often use in combination with an optically diffusive layer (a "diffuser"); for example, to increase viewing angle. When typical diffusers are applied to the bottom of optical films they reduce gain. Diffusers are used in liquid crystal displays (LCDs) to hide the light bulbs used as backlights. Diffusers typically help make the light more uniform, but may reduce the transmission of light through the optical film, and/or reduce image clarity.

There are two main types of diffusers: surface diffusers wherein surface particles cause optical diffusion, and bulk diffusers wherein diffusive particles are dispersed throughout a binder. With surface diffusers, the particles typically have the same refractive index as the resin and the diffusion is limited to the air/bead interface (a single bounce). Typically, surface diffusers are oriented facing away from the light source in display constructions such as LCD displays. Bulk diffusers rely on having a difference in refractive index between the diffusive particle and the binder.

SUMMARY

In one aspect, the present disclosure provides an optical construction comprising:
  a first layer having a first major surface and a second major surface opposite the first major surface, wherein the first major surface comprises a polyester and is optically transmissive;
  a second layer adjacent and directly bonded to the first major surface, wherein the second layer is optically transmissive, and wherein the second layer comprises:
    a first binder, wherein the first binder comprises polyethylene oxide segments, and wherein the polyethylene oxide segments comprise from 55 percent to 99.9 percent by weight based on a total weight of the first binder; and
    first optical beads, wherein a weight ratio of the first binder to the first optical beads is in a range of from 44:56 to 50:50, and wherein voids are disposed at an interface of the first layer and the second layer; and
  a light source disposed in a fixed orientation relative to the second layer, wherein the second layer faces the light source.

In another aspect, the present disclosure provides a method of making an optical construction, the method comprising:
  contacting a curable composition with a first layer having a first major surface and a second major surface opposite the first major surface, wherein the first layer is optically transmissive, wherein the first major surface comprises a polyester, and wherein the curable composition comprises:
    a curable binder precursor comprising at least one curable monomer, wherein the at least one curable monomer comprises at least one polymerized curable monomer, wherein the at least one curable monomer comprises a polyethylene oxide segment; and
    first optical beads, wherein a weight ratio of the at least one curable monomer to the first optical beads is in a range of from 45:55 to 50:50; and
  at least partially curing the curable composition to provide a second layer, wherein the second layer is optically transmissive and comprises a first binder and the first optical beads, wherein polyethylene oxide segments comprise from 55 percent to 99.9 percent by weight based on a total weight of the first binder, and wherein voids are disposed at an interface of the first layer and the second layer; and
  disposing a light source in a fixed orientation relative to the second layer, wherein the second layer faces the light source.

In some embodiments, the curable composition further comprises a photoinitiator.

The following embodiments pertain to the abovementioned aspects and embodiments of the present disclosure.
In some embodiments, a difference between indices of refraction of the first optical beads and the first binder is less than 0.01. In some embodiments, the polyester is selected from the group consisting of PET, PEN, and co-PEN. In some embodiments, for light incident on the optically transmissive second layer, an axial luminance gain of the optical construction is not less than an axial luminance gain of the first layer. In some embodiments, the voids occupy at least 30 percent of the interface.

In some embodiments, the optical construction further comprises second optical beads secured to the second major surface by a second binder.

In some embodiments, the first layer comprises a reflective polarizer. In some embodiments, the first layer has a first surface in contact with the interface, wherein the first surface has a first average surface energy, and wherein the binder has a second average surface energy that is greater than the first average surface energy. In some embodiments, the optical beads are substantially spherical. In some embodiments, the first layer comprises a multilayer optical film.

In yet another aspect, the present disclosure provides an electronic device comprising an optical construction according to the present disclosure. In some embodiments, the electronic device comprises a liquid crystal display.

Advantageously, the optically transmissive second layer diffuses light (i.e., serves as a diffuser) and may even increase the optical gain (brightness) of optical films such as brightness enhancement structured films and multilayer optical films (e.g., reflective polarizers), as compared to when the optically transmissive second layer is absent. When typical diffuser layers are applied to the bottom side of such films they reduce gain. This diffuser increases gain.

As used herein:
"co-PEN" refers to a polyester copolymer of preparable by condensation polymerization (with removal of methanol) of ethylene glycol, 2,6-dicarbomethoxynaphthalene, and 1,4-dicarbomethoxybenzene;
"directly bonded" means bonded through direct adhesive contact without the aid of additional adhesives or mechanical fasteners;

"optical bead" refers to a transparent or translucent particle.

"PEN" refers to polyethylene 2,6-naphthalenedicarboxylate; and

"PET" refers to polyethylene terephthalate.

As used herein, the singular forms "a", "an", and "the" encompass embodiments having plural referents, unless the content clearly dictates otherwise. For example, reference to "a film" encompasses embodiments having one, two or more films. As used in this specification and the appended claims, the term "or" is generally employed in its sense including "and/or" unless the content clearly dictates otherwise.

The features and advantages of the present disclosure will be understood upon consideration of the detailed description of the preferred embodiment as well as the appended claims. These and other features and advantages of the disclosure may be described below in connection with various illustrative embodiments of the disclosure. The above summary is not intended to describe each disclosed embodiment or every implementation of the present disclosure. The Figures and the detailed description which follow more particularly exemplify illustrative embodiments.

BRIEF DESCRIPTION OF THE DRAWINGS

FIG. 1 is a cross-sectional view of an exemplary optical construction according to the present disclosure.

While the above-identified drawing figures set forth several embodiments of the present disclosure, other embodiments are also contemplated, as noted in the discussion. In all cases, this disclosure presents the disclosure by way of representation and not limitation. It should be understood that numerous other modifications and embodiments can be devised by those skilled in the art, which fall within the scope and spirit of the principles of the disclosure. The figures may not be drawn to scale. Like reference numbers may have been used throughout the figures to denote like parts.

DETAILED DESCRIPTION

Referring now to FIG. 1, exemplary optical construction 100 has optically transmissive first layer 110, with first major surface 115, second major surface 117, and optically transmissive second layer 120 adjacent and directly bonded to the optically transmissive first layer 110. The optically transmissive second layer 120 comprises a first binder 150 and first optical beads 160. Second layer 120 faces light source 170, capable of emitting light 180, and which is disposed in a fixed orientation relative to the optically transmissive second layer 120. The first binder 150 comprises polyethylene oxide segments (not shown) that comprise from 55 percent to 99.9 percent by weight based on a total weight of the first binder 150. A weight ratio of the first binder 150 to the first optical beads is in a range of from 44:56 to 50:50. A plurality of voids 130 are disposed between optically transmissive first layer 110 and second layer 120. Optional second optical beads 140 are secured to second major surface 117 by optional second binder 145.

The first layer is optically transmissive and has a first surface comprising a polyester. The first layer may comprise a single layer, or it may be a multilayered composite. For example, it may be an engineered optical film such as for, example, a structured film or multilayer optical film with a polyester skin.

The optical beads are solid articles that are optically transmissive, typically transparent. They may be made of any suitable optically transmissive material known to those of ordinary skill in the art, such as organic (e.g., polymeric) or inorganic materials. Some exemplary materials include, without limitation, inorganic materials, such as silica (e.g., as available as ZEEOSPHERES from 3M Company of St. Paul, Minn.), sodium aluminosilicate, alumina, glass, talc, alloys of alumina and silica, and polymeric materials, such as liquid crystal polymers (e.g., as available as VECTRAM liquid crystal polymer from Eastman Chemical Products, Inc. of Kingsport, Tenn.), amorphous polystyrene, styrene acrylonitrile copolymer, cross-linked polystyrene particles or polystyrene copolymers, polydimethylsiloxane, crosslinked polydimethylsiloxane, polymethylsilsesquioxane, and polymethyl methacrylate (PMMA) (e.g., crosslinked PMMA), or any suitable combinations of these materials. Other suitable materials include inorganic oxides and polymers that are substantially immiscible and do not cause deleterious reactions (degradation) in the material of the layer during processing of the particle-containing layers, are not thermally degraded at the processing temperatures, and do not substantially absorb light in the wavelength or wavelength range of interest.

The optical beads generally have a mean diameter in the range of, for example, 1 to 50 microns, although other sizes may also be used. Typically, the particles have a mean diameter in the range of 1 to 40 microns, or in some embodiments 2 to 35 microns. In at least some instances, smaller optical beads are desirable because this permits the addition of more optical beads per unit volume of the coating, often providing a rougher or more uniformly rough surface or more light diffusion centers. In some embodiments, the bead size distribution can be +/−50 percent, and in other embodiments, it may be +/−40 percent. Other embodiments may include bead size distributions of less than 40 percent variation from the mean, including a monodisperse distribution.

Although optical beads with any shape can be used, generally spherical optical beads and/or oblate optical beads are desired in some instances, particularly for maximizing color hiding and gain. For surface diffusion, spherical particles give a large amount of surface relief per particle compared to other shapes, as non-spherical particles tend to align in the plane of the second layer so that the shortest principle axis of the particles is in the thickness direction of the second layer.

The binder is optically transmissive, typically transparent. In most exemplary embodiments, the binder is polymeric, and typically crosslinked. Depending on the intended use, the binder is typically made from radiation curable (e.g., UV curable or e-beam curable) monomers, oligomer, and prepolymers, typically UV-curable, although other binders may be used.

Examples of useful oligomers include urethane acrylate oligomers (e.g., as available as PHOTOMER 6010 from Cognis Corp. of Cincinnati, Ohio), ionization radiation. Free-radically polymerized prepolymers are preferable because their hardening speed is high and enables to design the resin freely. Examples of radiation curable prepolymers include prepolymers with one or more acrylate or methacrylate groups such as urethane acrylates and methacrylates, epoxy acrylates and methacrylate, melamine acrylates and methacrylates, and polyester acrylates and methacrylates. Examples of useful radiation curable monomers include polyethylene glycol (400) diacrylate as available as SR344, ethoxylated (20) trimethylolpropane triacrylate as available as SR415, ethoxylated (15) trimethylolpropane triacrylate as available as SR9035, polyethylene glycol (600) diacrylate as available as SR610, ethoxylated (10) Bisphenol A diacrylate as available as SR602, polyethylene glycol 1000 dimethacrylate as available as SR740, and ethoxylated (30) Bisphenol A diacrylate as available as SR 9038, ethoxylated (30) Bisphenol A dimethacrylate as available as SR9036, all from Sartomer Company of Exton, Pa. Mixtures of acrylate and/or methacrylate monomers, oligomers, and polymers, which may be ethoxylated or nonethoxylated, may also be used in any combination as long as the overall content of polyether segment is at least 55 percent by weight based on the total weight of the binder.

Typically, the binder precursor includes a curative and/or initiator (e.g., a thermal initiator or a photoinitiator). Photoinitiators are generally used if the binder precursor is to be UV-curable. Examples of photoinitiators useful for curing free-radically curable resins (e.g., acrylate-based binder precursors) are well known in the art and include benzoin ethers, ketals, benzophenones, acetophenones, triaryl- and triacylphosphines and phosphine oxides, and thioxanthones. One useful photoinitiator is available as ESACURE ONE from Sartomer Co. of Exton, Pa. The photoinitiators can be used alone or as a mixture thereof. The photoinitiator is normally required in an effective amount (e.g., 0.1 to 7 percent) for UV-curable resins, but may be omitted for electron beam radiation curable resins.

The curable binder precursor may include intensifiers, pigments, fillers, non-reactive polymer resins, leveling agents and the like as occasion demands, in addition to the photopolymerizable components and the photoinitiator.

In some embodiments, the curable binder precursor is coated from solvent before curing. In such embodiments, it is desirable to remove most or all of the solvent before curing.

The curable binder precursor is typically mixed with the optical beads in an amount such that after curing the resultant binder contains from 44 to 50 percent of the optical beads based on the total weight of the binder.

In some embodiments, the binder is flexible when cured, such that the optical construction is a flexible film that can be rolled.

In some exemplary embodiments, the refractive index difference between the optical beads and the binder is in the range of, for example, 0 to 0.12. To obtain diffusing (e.g., scattering) effects, the optical beads can have an index of refraction different than the index of refraction of the binder (bulk diffusion). Alternatively, the index of the particles can be matched to the index of refraction of the binder, in which case the rough surface alone supplies the required diffusion (surface diffusion) or gain improvement. In some instances, it may be preferred that the optical beads have an index of refraction that is substantially similar to the index of refraction of the binder. For example, the index difference between the optical beads and binder can be 0.2 or less, 0.1 or less, desirably 0.05 or less, and more desirably 0.01 or less.

The difference in the indices of refraction of the optical beads and the binder can influence factors such as, for example, the normal angle gain (a measure of the amount of increased brightness obtained using the optical film in a backlit display configuration) of the optical construction and the amount of color averaging obtained by scattering. Generally, normal angle gain decreases with increased difference between the indices of refraction of the optical beads and the binder. In contrast, the amount of color averaging increases with increased difference between the indices of refraction of the optical beads and the binder because larger index differences lead to higher scattering. Thus, the optical beads and the materials of the binder can be selected, based at least in part on their indices of refraction, to achieve a desired balance of these properties.

The second layer also can be characterized in terms of coating weight. It is believed that when the coating weight falls within a desired range, the optical construction will have improved gain over the same optical construction without the second layer. This or other advantageous purposes may be accomplished by adjusting the bead to binder ratio of the second layer composition and/or disposing the second layer mixture on a substrate, such that the second layer mixture has a dry weight of 5 to 50 grams per square meter ($g/m^2$). In other exemplary embodiments, the second layer mixture disposed on a substrate may have a dry weight of 5 to 35 $g/m^2$, 5 to 30 $g/m^2$, or 5 to 25 $g/m^2$.

In embodiments wherein the second layer has a thickness of from about 1.5 to 3 times the average diameter of the optical beads, it is believed that advantageous performance may be achieved in embodiments wherein an average binder thickness of 5 to 10 microns over a linear inch on a major surface of an optical construction (such as an optical film), although other thicknesses may also be useful. Thickness can be measured, for example, by making a cross-section of an exemplary optical construction, taking at least 10 measurements over an inch (or two inches) of a sample using any suitable microscopic techniques and equipment, and averaging the measurements made to produce a dry average binder thickness value.

In addition, the second layer can be characterized based on the degree to which the voids cover the interface. Increasing the area occupied by voids may provide additional advantages in luminance gain.

In some embodiments, the second surface of the first layer may have another layer of optical beads disposed thereon, typically covering an amount of from 60 percent, 70 percent, or even 90 percent or more of the second surface.

Voids formed at the interface between the first and second layers and/or the optical beads can increase gain at the normal axis. In addition, monolayer or greater distribution can also reduce or eliminate visible off-axis color non-uniformities for multilayer optical film reflective polarizers. The gain using an optical construction of the present disclosure with a second layer disposed such that light is incident on the surface of the substrate opposite the second layer is improved as compared to the same optical construction without the second layer. Desirably, the gain is improved by 1 percent or more, more desirably, by 2 percent or more, and even more desirably, by 3 percent or more for a wavelength (e.g., 632.8 nm) or wavelength range of interest. Here, the percent improvement is calculated as the difference between the gain of the optical construction with the second layer and the gain of the same optical construction but without the second layer divided by the gain of the optical construction without the second layer.

As used herein, the term "gain" refers to the ratio (a:b) of (a) the luminance of a backlight or display over a desired wavelength range at a particular viewing angle (with respect to a normal axis), to (b) the luminance of the same backlight or display over the desired wavelength range at the particular viewing angle (with respect to a normal axis) alone, i.e., without the optical construction.

"Axial angle gain" refers to luminance gain at a viewing angle normal to the display, or at 90 degrees relative to a major plane or surface of the optical construction.

"Contrast ratio" can be defined as follows. For a given viewing direction, a contrast ratio is defined as the ratio of the light intensity of the brightest white and the darkest black capable of being displayed on a screen. Typically, contrast ratio is measured for a specific location on a screen, with the display driven to brightest white and darkest black on separate occasions.

In some embodiments, optical constructions according to the present disclosure can have a contrast ratio improvement as compared to the same optical construction without the second layer. For example, the contrast ratio may be improved by 10 percent or more.

Desirably, the optical beads do not substantially absorb or depolarize light transmitted by the reflective polarizing element, and the amount of light transmitted through the optical construction is not substantially reduced. If the first layer comprises a reflective polarizer, it is desirable that the beads and binder have low birefringence.

The light source may be any source that generates visible light such as for example, cold cathode fluorescent tubes (CCFT) or light emitting diodes (LEDs). In LCD-containing electronic articles, the light source is included in a backlight. A backlight typically couples light from one or more light sources such as one or more cold cathode fluorescent tubes (CCFT) or light emitting diodes (LEDs)) to a substantially planar output. The substantially planar output is then coupled to the LCD panel. The light source may be fixed relative to the first and second layers by any suitable means including, for example, adhesives and/or mechanical fasteners.

Optical constructions according to the present disclosure may be made, for example, by mixing optical beads and curable resins to form a binder precursor, optionally diluting the binder precursor with solvent, coating on the first layer, removing any optional solvent, and curing the binder precursor. Suitable curing methods are well known and include ultraviolet light (UV), and e-beam curing methods.

Without wishing to be bound by theory, it is believed that dewetting of the first layer by the binder precursor, caused by mismatched surface energies, leads to coating defects that create voids at the interface between the first and second layers. For example, the first layer may have a first surface (i.e., the surface in contact with the interface) with a lower average surface energy than the average surface energy of the binder precursor and/or binder. The voids formed during the coating and/or drying steps and are locked in placed during curing. Accordingly, since relatively poor wet out of the first layer is desired, any surface modification of the first layer to promote wetting should be with caution, if at all.

Optical constructions according to the present disclosure are useful, for example, in the fabrication of various electronic articles that include a liquid crystal display (LCD). Display devices, such as liquid crystal display (LCD) devices, are used in a variety of applications including, for example, televisions, hand-held devices, digital still cameras, video cameras, cellular phones, and computer monitors. Unlike a traditional cathode ray tube (CRT), an LCD panel is not self-illuminating and, therefore, sometimes requires a backlighting assembly or a "backlight." A backlight typically couples light from one or more light sources (e.g., a cold cathode fluorescent tube (CCFT) or light emitting diodes (LEDs)) to a substantially planar output. The substantially planar output is then coupled to the LCD panel.

Brightness of an LCD may also be enhanced by efficiently utilizing the light that is available within the LCD device (e.g., to direct more of the available light within the display device along a preferred viewing axis). For example, a structured optical film having a PET outer skin available as VIKUITI BRIGHTNESS ENHANCEMENT FILM (BEF), available from 3M Company, has prismatic surface structures, which redirect some of the light exiting the backlight outside the viewing range to be substantially along the viewing axis. The effectiveness of such structured films used for such applications may be enhanced, according to the present disclosure, by coating and curing the second layer on a surface of a structured film that is opposite the structured surface such that it acts as a diffuser, desirably a gain enhancing diffuser.

Another type of an optical element that may be used to increase brightness of an LCD display is a reflective polarizer. Reflective polarizers typically reflect light of one polarization for a given wavelength range and substantially pass light of a different polarization. When reflective polarizers are used in conjunction with backlights in liquid crystal displays to enhance brightness of the display, a reflective polarizer can be placed between a backlight and a liquid crystal display panel. This arrangement permits light of one polarization to pass through to the display panel and light of the other polarization to recycle through the backlight or to reflect off a reflective surface positioned behind the backlight, giving the light an opportunity to depolarize and pass through the reflective polarizer. One example of a polarizer includes a stack of polymer layers of differing compositions which has a co-Pen outer skin, is available as VIKUITI DUAL BRIGHTNESS ENHANCEMENT FILM (DBEF) from 3M Company. In one embodiment configuration, this stack of layers includes a first set of birefringent layers and a second set of layers with an isotropic index of refraction. The second set of layers alternates with the birefringent layers to form a series of interfaces for reflecting light. Another type of reflective polarizer includes continuous/disperse phase reflective polarizers that have a first material dispersed within a continuous second material that has an index of refraction for one polarization of light that is different than the corresponding index of the first material, such as those having an outer skin layer of PET available as VIKUITI DIFFUSE REFLECTIVE POLARIZER FILM (DRPF) from 3M Company. Other types of reflective polarizer include other linear reflective polarizers, such as wire grid polarizers, and circular reflective polarizers, such as cholesteric liquid crystal polarizers.

The effectiveness of such reflective polarizers used for such applications may be enhanced, according to the present disclosure, by coating and curing the second layer on a surface of a structured film that is opposite the structured surface, thereby providing a diffuser layer, desirably a gain enhancing diffuser.

Objects and advantages of this disclosure are further illustrated by the following non-limiting examples, but the particular materials and amounts thereof recited in these examples, as well as other conditions and details, should not be construed to unduly limit this disclosure.

EXAMPLES

Unless otherwise noted, all parts, percentages, ratios, etc. in the Examples and the rest of the specification are by weight.

Examples 1-5, 1A-5A and Comparative Examples A-E

A diffuser was made as follows. A mixture consisting of 50 percent by weight of PMMA beads with 3 micron diameter (available as MB3-30X from Sekisui Plastics USA of Mount Pleasant, Tenn.), 50 percent Sartomer SR 444 resin (this and other later named Sartomer resins available from Sartomer Company of Exton, Pa.), and 1.3 parts per hundred of the photoinitiator ESACURE ONE (available from Lamberti USA of Conshohocken, Pa.). The mixture was dispersed in ethanol and stirred with a magnetic stirrer. The resulting solution was coated on DBEF-Q multilayer optical film having co-PEN outer skins layers (available as VIKUITI DBEF-Q from 3M Company of St. Paul Minn.) at 26 percent solids using a wire-wound rod (available as a #24 Meyer rod from RD Specialties, of Webster N.Y., nominal coating thickness of 2.16 mils (0.055 mm))) The coated film was dried for 2 minutes at 80° C. The coated and dried film was then cured using a Fusion Systems Model 1300P fitted with a 500 Watt H bulb (available from Fusion Systems, Gaithersburg Md.) at 30 feet per/minute (9.14 m/min) The optical gain of the resulting film was measured using an AUTRONIC CONOSCOPE CONOSTAGE 3 (available from Autronic-Melchers GmbH of Karlsruhe, Germany). Further details concerning the Gain test can be found in U.S. Pat. Appln. Publ. No. 2008/0002256 A1 (Sasagawa et al.) in paragraph [0105]). Optical clarity was measured using a HAZE-GARD PLUS meter (available from BYK-Gardner, Silver Springs, Md.). The measured gain and clarity values are reported in Table 1.

Examples 1A-5A were the same as respective Examples 1-5, except: they were coated on PET film (available as 618-500 MELINEX from E.I. du Pont de Nemours and Co. of Wilmington, Del.), a #14 Meyer rod (nominal wet thickness of 0.9 mil (0.022 mm)) was used, and the samples were dried at 50° C. before UV curing.

Comparative Examples F-H

Example 1 from U.S. Pat. Appl. Publ. No. 2008/0002256 in paragraphs [0101]-[104] repeated. After coating and curing as described, the optical gain was measured with the diffuser facing the light source and facing away from it. The results are reported in Table 3. These results show that standard gain diffusers reduce optical gain when they face the light source. Unexpectedly, diffusers made according to the present disclosure produce an increase in optical gain when placed in that orientation.

TABLE 3

| COMPARATIVE EXAMPLE | DESCRIPTION | OPTICAL GAIN |
|---|---|---|
| F | Uncoated Reflective Polarizer | 1.692 |
| G | Coated RP facing away from light source | 1.891 |
| H | Coated RP facing light source | 1.557 |

TABLE 1

| EXAMPLE | RESIN | CHEMICAL NAME | ET (GAIN) | CLARITY | WEIGHT PERCENT OF POLYETHYLENE OXIDE SEGMENTS |
|---|---|---|---|---|---|
| Comparative Example A | SARTOMER 444 | pentaerymritol triacrylate | 1.707 | 33 | 0 |
| Comparative Example B | SARTOMER 295 | pentaerymritol tetraacrylate | 1.696 | 49 | 0 |
| Comparative Example C | SARTOMER 444C | pentaerymritol triacrylate (high OH) | 1.686 | 78 | 0 |
| Example 1 | SARTOMER 344 | polyethylene glycol (400) diacrylate | 1.713 | 72 | 99 |
| Example 2 | SARTOMER 415 | ethoxylated (20) trimethylolpropane triacrylate | 1.739 | 9 | 76 |
| Example 3 | SARTOMER 9035 | ethoxylated (15) trimethylolpropane triacrylate | 1.708 | 38 | 70 |
| Comparative Example D | SARTOMER 399 | dipentaerythritol pentaacrylate | 1.701 | 43 | 0 |
| Comparative Example E | SARTOMER 499 | ethoxylated (6) trimethylolpropane triacrylate | 1.684 | 82 | 48 |
| Example 4 | SARTOMER 602 | ethoxylated (10) Bisphenol A diacrylate | 1.724 | 28 | 58 |
| Example 5 | SARTOMER 9038 | ethoxylated (30) Bisphenol A diacrylate | 1.747 | 11 | 80 |

TABLE 2

| Example 1A | SARTOMER 344 | polyethylene glycol (400) diacrylate | 1.063 | 25 | 99 |
|---|---|---|---|---|---|
| Example 2A | SARTOMER 415 | ethoxylated (20) trimethylolpropane triacrylate | 1.059 | 17 | 76 |
| Example 3A | SARTOMER 9035 | ethoxylated (15) trimethylolpropane triacrylate | 1.063 | 18 | 70 |
| Example 4A | SARTOMER 602 | ethoxylated (10) Bisphenol A diacrylate | 1.060 | 27 | 58 |
| Example 5A | SARTOMER 9038 | ethoxylated (30) Bisphenol A diacrylate | 1.062 | 14 | 80 |

For comparison, the bare DBEF Q film has a gain of 1.691. As can be seen from Table 1, the binder resins that have the higher levels of ethoxylation (SR 415 and SR 9038) have high gain and low clarity (low clarity relates to good bulb hiding). The high level of ethoxylation leads to high surface tension and in addition, these resins have a low enough viscosity to dewet from the DBEF Q film and be absorbed into the capillaries between the beads.

Examples 6-7 and Comparative Examples I-L

All of the following formulations consisted of 3 micron PMMA beads (available as SOKEN TS-35C from Soken Chemical and Engineering Co., Ltd., Tokyo, Japan) and resin (listed below) with 1.3 parts per hundred weight of added photoinitiator available as ESACURE ONE from Sartomer Co. These were dispersed in ethanol and coated at 26 percent solids using a #24 Meyer rod (nominal coating thickness of 2.16 mils) available from R. D. Specialties of Webster, N.Y., onto the multilayer optical film used in Example 1 and dried 2 minutes at 80° C. Following drying, they were cured using a Fusion Systems 500 watt H-type bulb operating at a line speed of 30 feet/minute. ET (Gain) and clarity were measure as in Example 1.

The control formulation was a typical bulk diffuser formulation. It consisted of 60 parts 3 micron polystyrene beads (available as SOKEN KSR-3A from Soken Chemical and Engineering Co., Ltd.), 36 parts SR399 and 4 parts PHOTOMER 6010 (polyurethane diacrylate oligomer from Cognis Corp. of Cincinnati, Ohio). These were dispersed at 40 percent solids in 50:50 ethanol: propylene glycol methyl ether. One part per hundred weight of ESACURE ONE was added as the photoinitiator. This was coated at 40 percent solids using a #24 Meyer rod (nominal wet thickness of 0.9 mil) available from R. D. Specialties of Webster, N.Y., onto the multilayer optical film used in Example 1 and dried 2 minutes at 80° C. Following drying, they were cured using a Fusion UV Systems 500 watt H-Type bulb at 30 feet/minute. ET (Gain) and clarity were measured as in Example 1.

TABLE 4

| EXAMPLE | BEAD:RESIN RATIO | ET (Gain) | CLARITY |
|---|---|---|---|
| COMPARATIVE EXAMPLE I | 42:58 | 1.697 | 99 |
| COMPARATIVE EXAMPLE J | 47:53 | 1.695 | 98 |
| EXAMPLE 6 | 50:50 | 1.649 | 4 |
| EXAMPLE 7 | 53:47 | 1.642 | 4.1 |
| COMPARATIVE EXAMPLE K | 58:42 | 1.557 | 3.8 |
| COMPARATIVE EXAMPLE L | Control (PS beads) | 1.488 | 4.6 |

All patents and publications referred to herein are hereby incorporated by reference in their entirety. All examples given herein are to be considered non-limiting unless otherwise indicated. Various modifications and alterations of this disclosure may be made by those skilled in the art without departing from the scope and spirit of this disclosure, and it should be understood that this disclosure is not to be unduly limited to the illustrative embodiments set forth herein.

What is claimed is:

1. An optical construction comprising:
   a first layer having a first major surface and a second major surface opposite the first major surface, wherein the first major surface comprises a polyester and is optically transmissive;
   a second layer adjacent and directly bonded to the first major surface, wherein the second layer is optically transmissive, and wherein the second layer comprises:
      a first binder, wherein the first binder comprises polyethylene oxide segments, and wherein the polyethylene oxide segments comprise from 55 percent to 99.9 percent by weight based on a total weight of the first binder; and
      first optical beads, wherein a weight ratio of the first binder to the first optical beads is in a range of from 44:56 to 50:50, and wherein voids are disposed at an interface of the first layer and the second layer; and
   a light source disposed in a fixed orientation relative to the second layer, wherein the second layer faces the light source.

2. The optical construction of claim 1, wherein a difference between indices of refraction of the first optical beads and the first binder is less than 0.01.

3. The optical construction of claim 1, wherein the polyester is selected from the group consisting of PET, PEN, and co-PEN.

4. The optical construction of claim 1, wherein the voids occupy at least 30 percent of the interface.

5. The optical construction of claim 1, wherein for light incident on the second layer, an axial luminance gain of the optical construction is not less than an axial luminance gain of the first layer.

6. The optical construction of claim 1, further comprising second optical beads secured to the second major surface by a second binder.

7. An electronic device comprising a liquid crystal display and the optical construction of claim 1.

8. A method of making an optical construction, the method comprising:
   contacting a curable composition with a first layer having a first major surface and a second major surface opposite the first major surface, wherein the first layer is optically transmissive, wherein the first major surface comprises a polyester, and wherein the curable composition comprises:
      a curable binder precursor comprising at least one curable monomer, wherein the at least one curable monomer comprises at least one polymerized curable monomer, wherein the at least one curable monomer comprises a polyethylene oxide segment; and
      first optical beads, wherein a weight ratio of the at least one curable monomer to the first optical beads is in a range of from 45:55 to 50:50; and
   at least partially curing the curable composition to provide a second layer, wherein the second layer is optically transmissive and comprises a first binder and the first optical beads, wherein polyethylene oxide segments comprise from 55 percent to 99.9 percent by weight based on a total weight of the first binder, and wherein voids are disposed at an interface of the first layer and the second layer; and
   disposing a light source in a fixed orientation relative to the second layer, wherein the second layer faces the light source.

9. The method of claim 8, wherein the curable composition further comprises a photoinitiator.

10. The method of claim 8, wherein the voids occupy at least 30 percent of the interface.

11. The method of claim 8, wherein a difference between indices of refraction of the first optical beads and the binder is less than 0.01.

12. The method of claim 8, wherein the polyester is selected from the group consisting of PET, PEN, and co-PEN.

13. The method of claim 8, wherein for light incident on the second layer, an axial luminance gain of the optical construction is not less than an axial luminance gain of the first layer.

14. The method of claim 8, wherein a second plurality of solid optical beads is secured to the second major surface by a second binder.

* * * * *